United States Patent [19]

Ho et al.

[11] Patent Number: 5,080,699
[45] Date of Patent: Jan. 14, 1992

[54] FILTER APPARATUS

[75] Inventors: Chi Pai Ho, Cary; Robert H. Petty, Sanford, both of N.C.

[73] Assignee: Trion, Inc., Sanford, N.C.

[21] Appl. No.: 616,184

[22] Filed: Nov. 20, 1990

[51] Int. Cl.$^5$ .............................. B01D 53/04
[52] U.S. Cl. ........................ 55/179; 55/316; 55/385.1; 55/475; 55/484; 55/495; 55/515; 55/518
[58] Field of Search ............ 55/179, 316, 385.1, 55/385.2, 387, 472, 473, 484, 495, 515–519, DIG. 31

[56] References Cited

U.S. PATENT DOCUMENTS

| | | | |
|---|---|---|---|
| 3,136,617 | 6/1964 | Wachter | 55/519 |
| 3,243,942 | 4/1966 | Burke | 55/387 |
| 3,344,590 | 10/1967 | Smith et al. | 55/516 X |
| 3,739,558 | 6/1973 | Huxson | 55/387 |
| 3,928,008 | 12/1975 | Petersen | 55/472 |
| 4,049,406 | 9/1977 | Rivers | 55/484 |
| 4,141,703 | 2/1979 | Mulchi | 55/316 |
| 4,187,091 | 2/1980 | Durre et al. | 55/499 |
| 4,225,328 | 9/1980 | Stiehl | 55/378 |
| 4,272,262 | 6/1981 | Britt et al. | 55/302 |
| 4,306,892 | 12/1981 | Atalla et al. | 55/279 |
| 4,359,330 | 11/1982 | Copley | 55/273 |
| 4,385,911 | 5/1983 | Popeil et al. | 55/316 |
| 4,390,354 | 6/1983 | Witchell | 55/337 |
| 4,743,280 | 5/1988 | Pappas | 55/429 |
| 4,808,203 | 2/1989 | Sabourin | 55/492 |
| 4,865,636 | 9/1989 | Raber | 55/484 |

*Primary Examiner*—Charles Hart
*Attorney, Agent, or Firm*—Burns, Doane, Swecker & Mathis

[57] ABSTRACT

A filter apparatus for filtering chemical gases and odors from a fluid is disclosed. The filter apparatus includes a plurality of filter cartridges which each include a filter material, and a housing which fixes the filter cartridges relative to each other such that the filter cartridges form a W-shape with each filter cartridge forming a leg of the W-shape, to maximize the filtering efficiency of the filter apparatus while minimizing the pressure drop across the filter apparatus. A table top air cleaner is also disclosed, and includes a housing having an inlet opening and an outlet opening, an arrangement for drawing air through the inlet opening and for forcing air out of the outlet opening, and a plurality of filter cartridges which each include a filter material and which are fixed inside the housing relative to each other such that they form a W-shape.

30 Claims, 15 Drawing Sheets

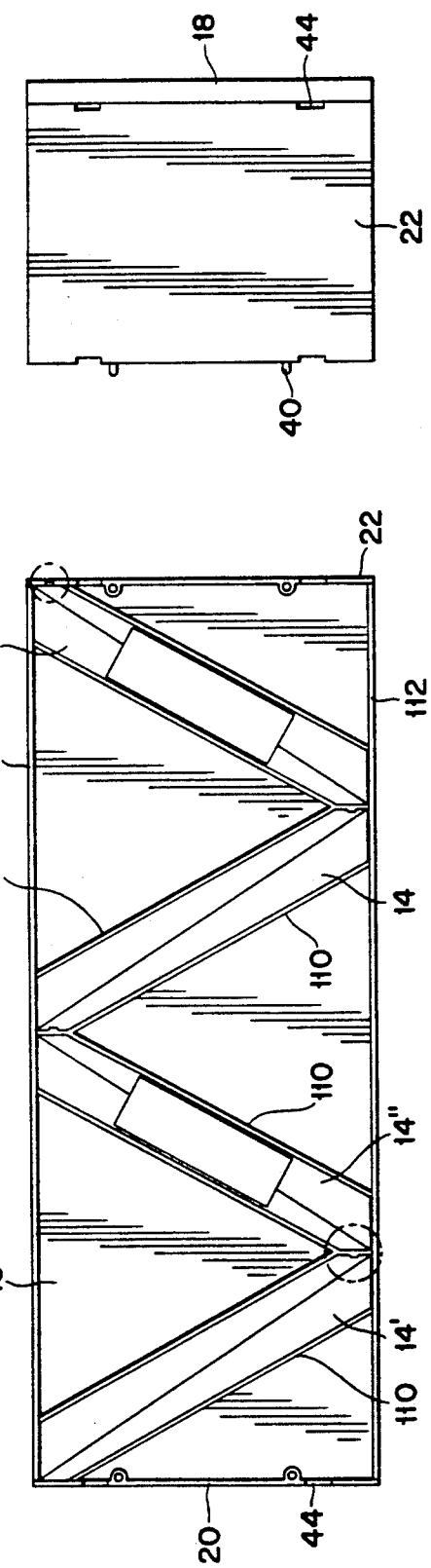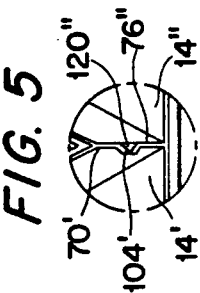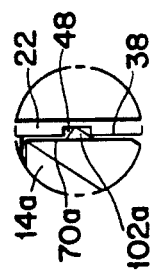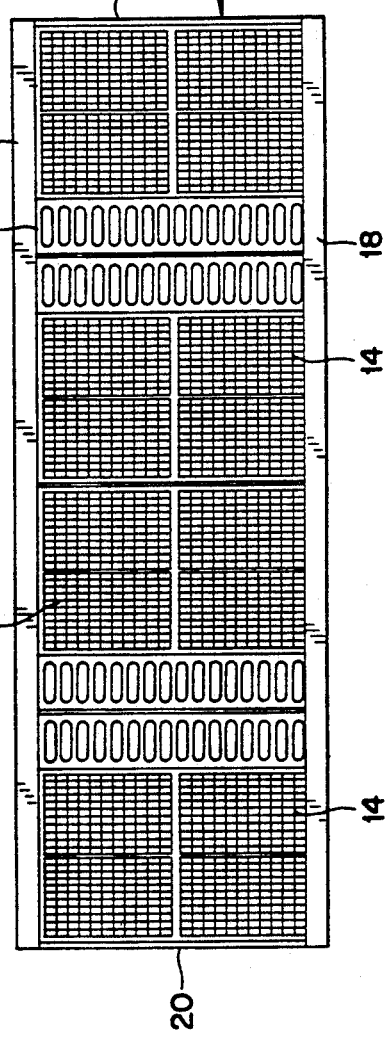

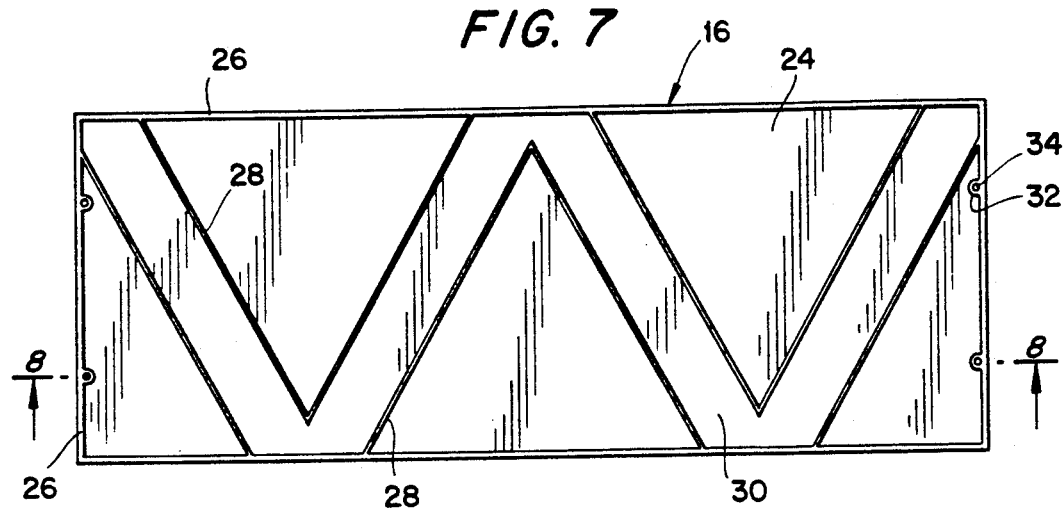
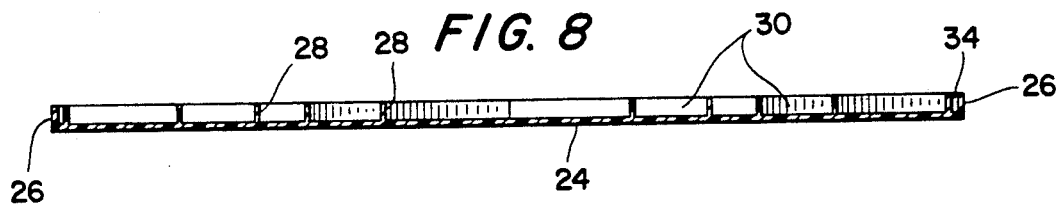
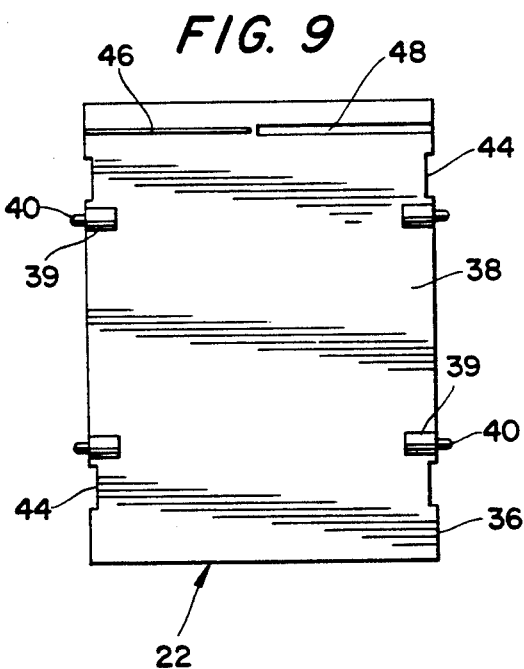
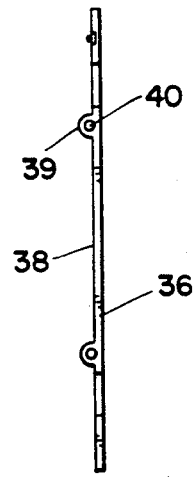
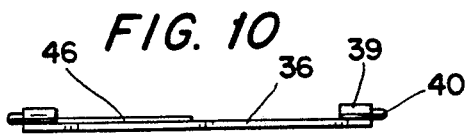

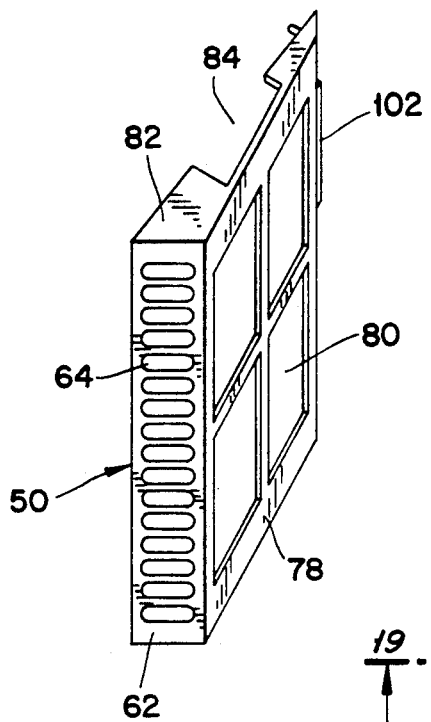
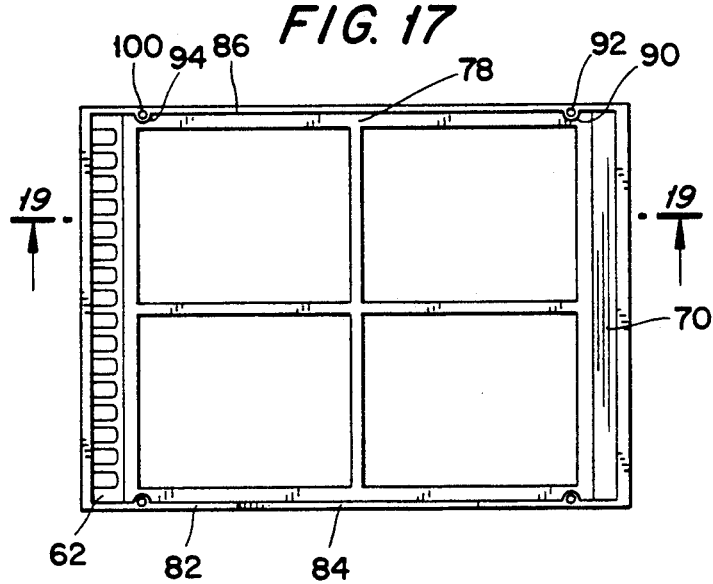
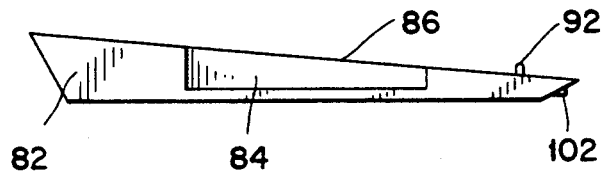

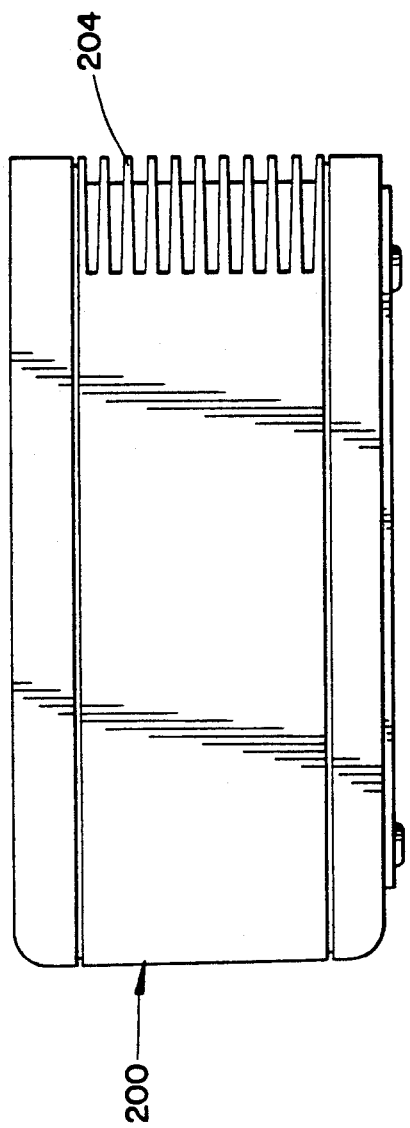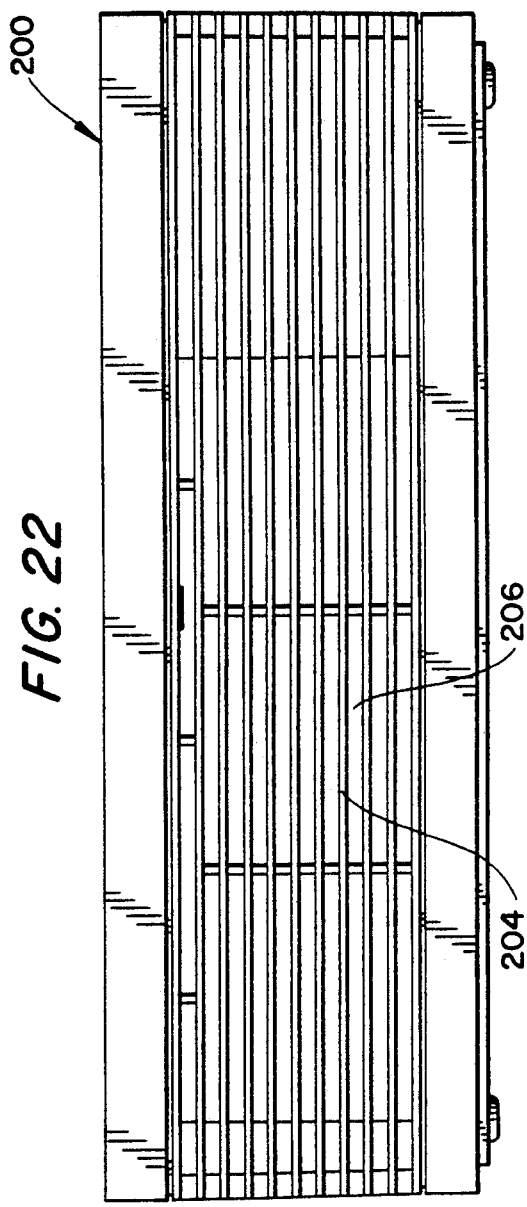

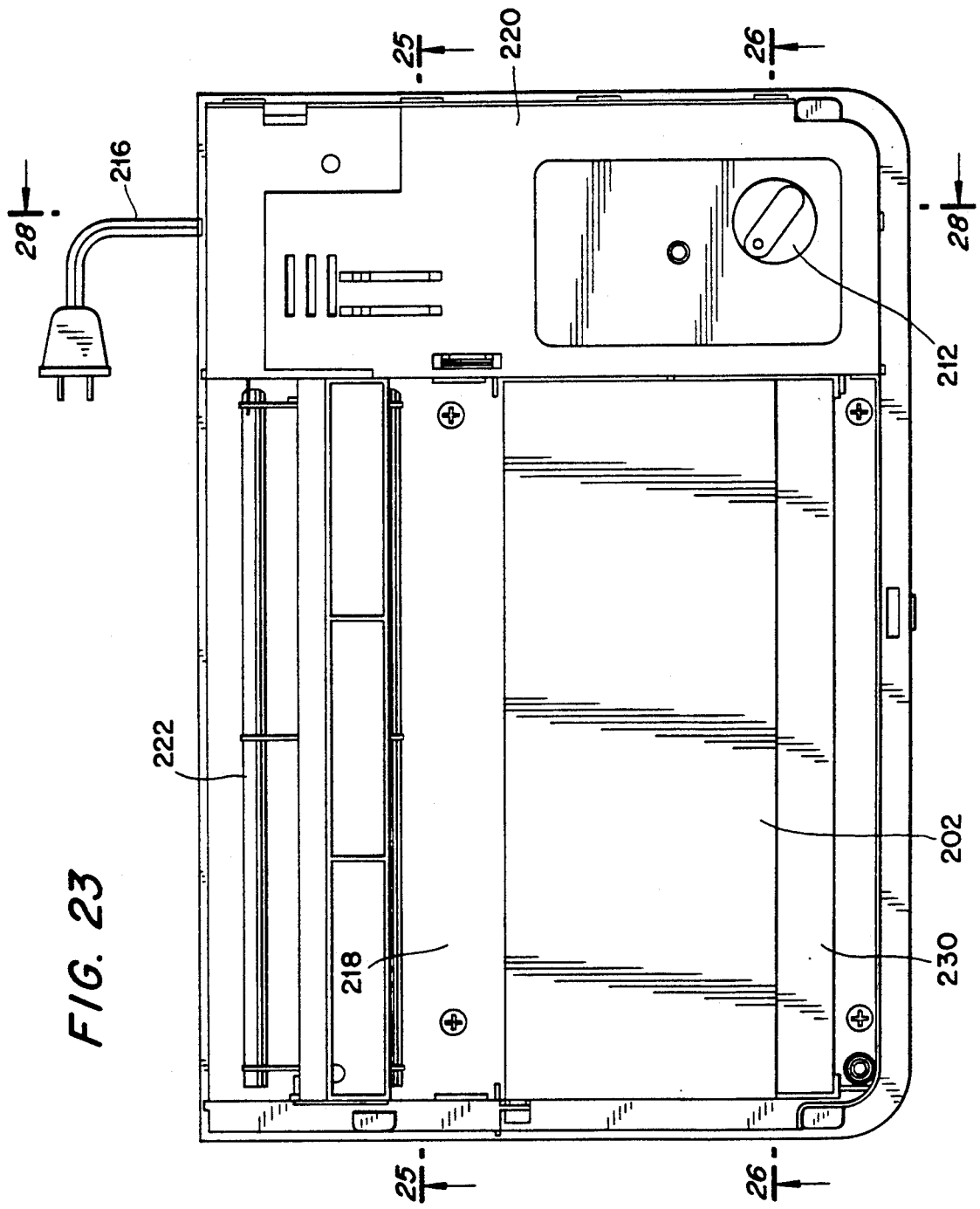

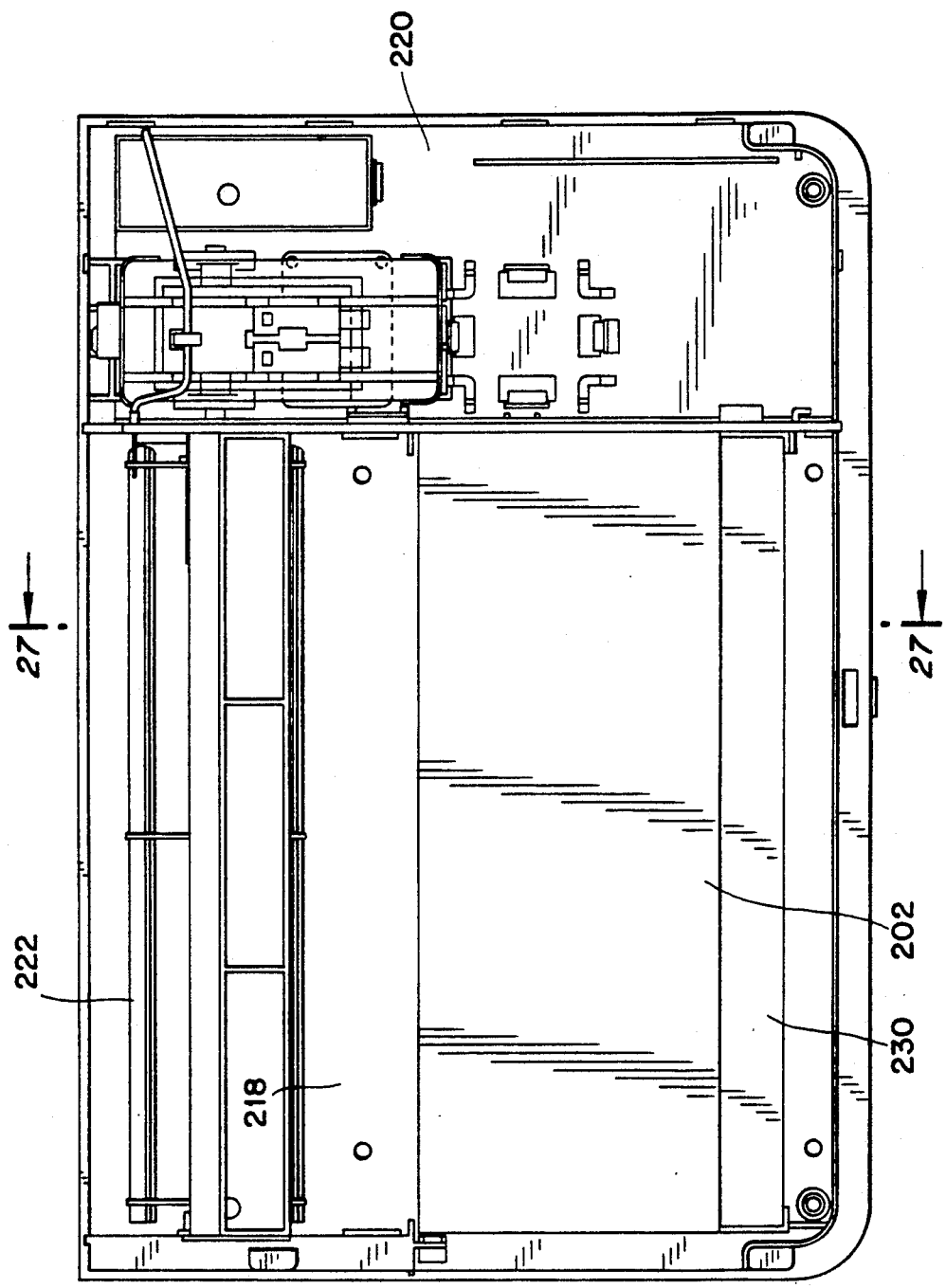

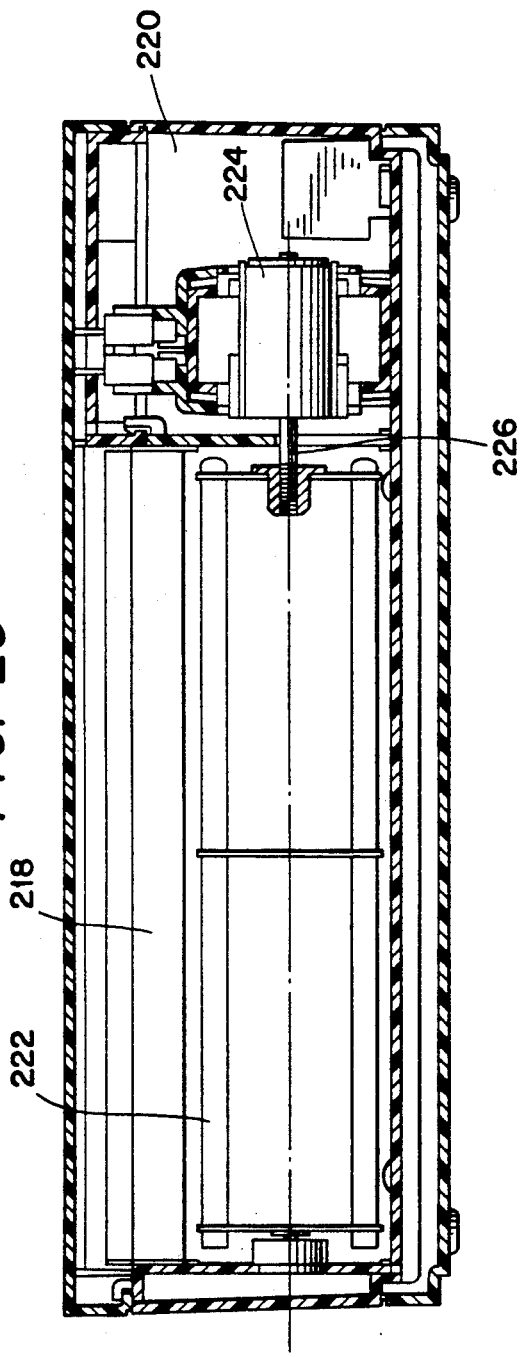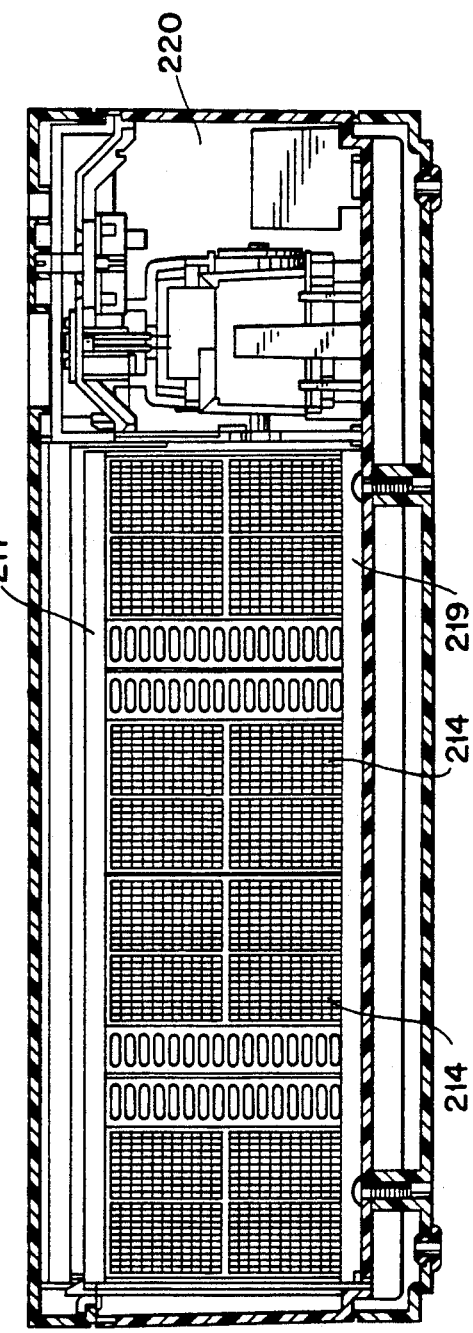

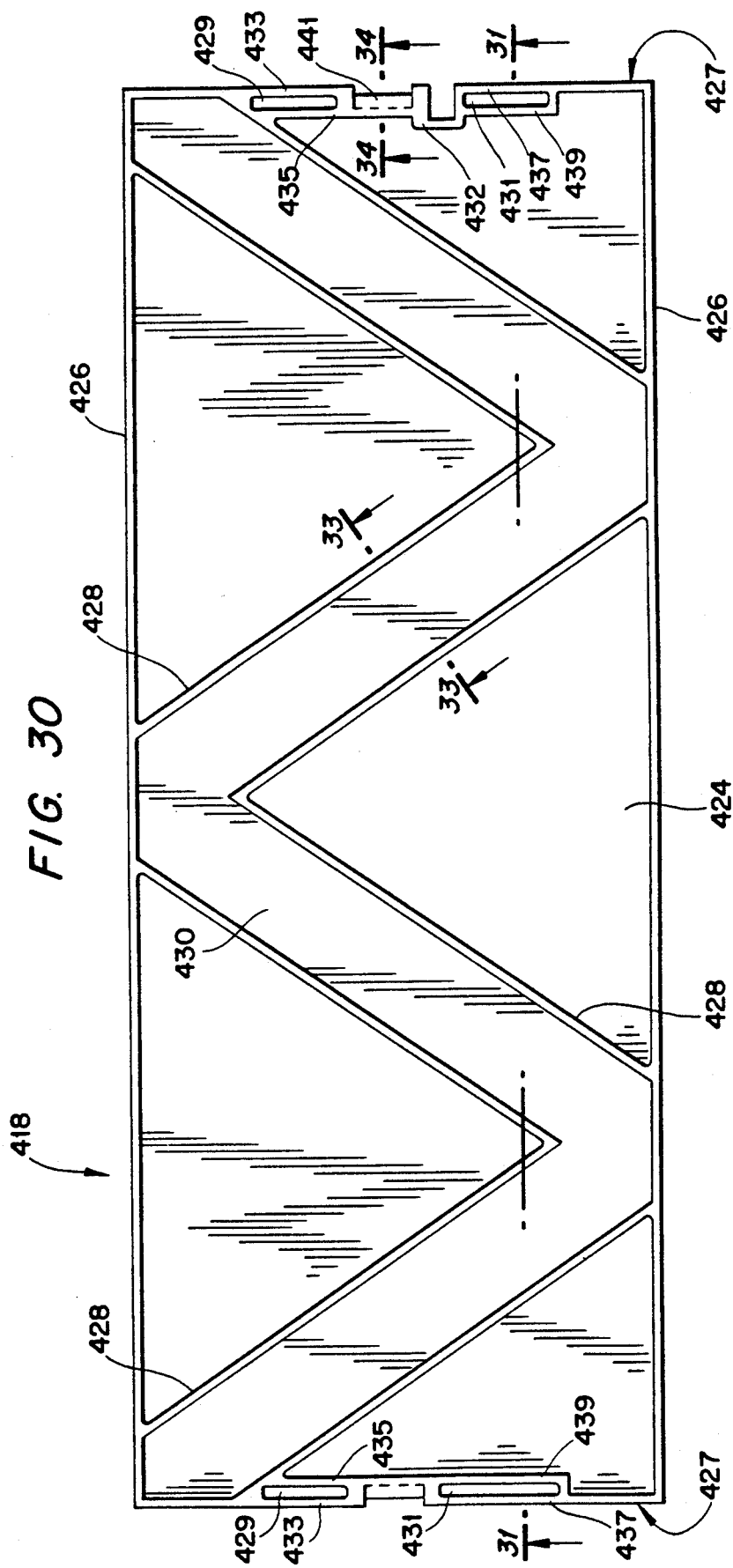

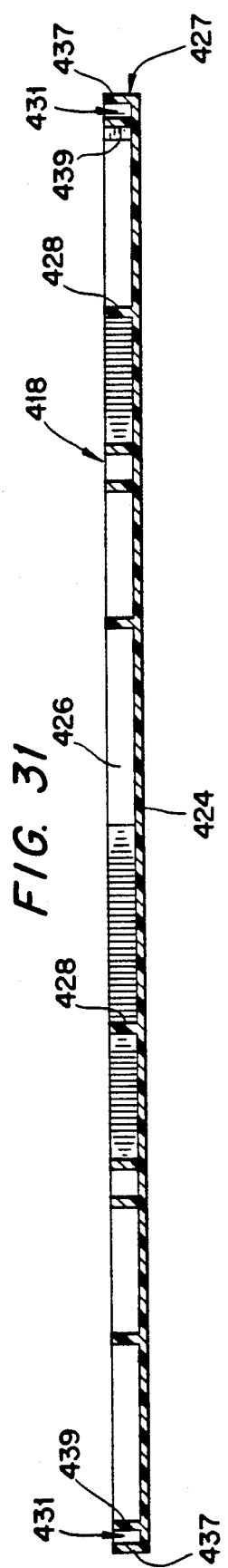
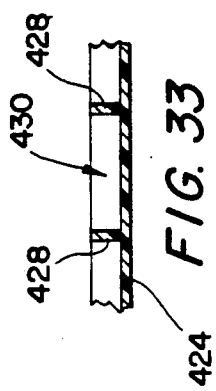
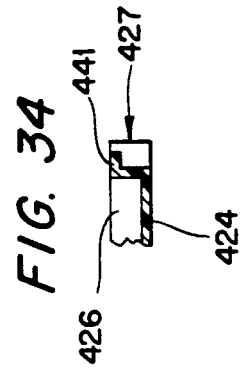
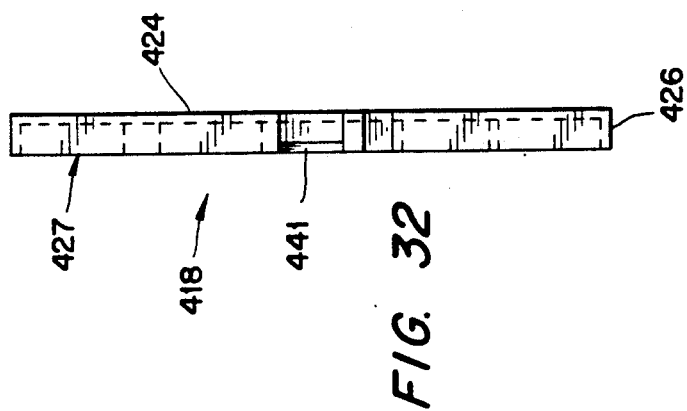

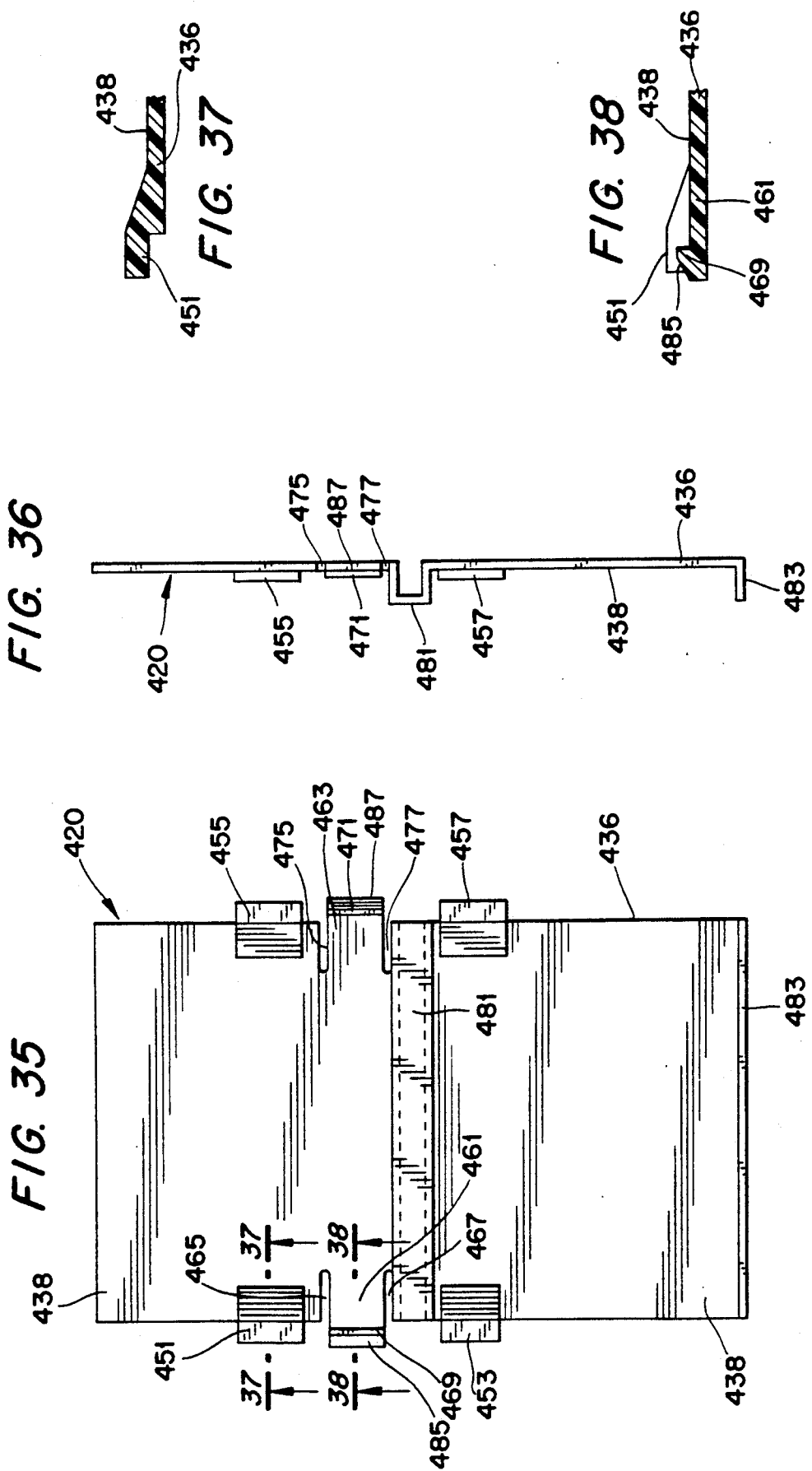

FILTER APPARATUS

BACKGROUND OF THE INVENTION

1. Field of the Invention

The present invention relates to apparatuses useful for filtering chemical gases from a fluid. More particularly, the present invention relates to adsorptive filter apparatuses for adsorbing chemical gases, especially gases causing odors, from air.

2. Description of the Related Art

Many types of devices which are adapted to remove relatively large substances such as solid or liquid particles from a fluid are known in the prior art. For example, U.S. Pat. No. 4,743,280 discloses an air filter apparatus which is formed with two V-shaped rectangular mesh filters held in place side by side within a housing and provided at an intake opening of a ventilation hood or air duct. The V-shaped filters catch grease and moisture which is in the air, and the grease and moisture drain from the vertice of the V-shape into a removable pan.

U.S. Pat. No. 4,272,262 discloses a filtering device for removing particulate matter from a gas stream, which includes a housing, and planar panel filters arranged in V-shaped banks inside the housing to clean the gas stream. U.S. Pat. No. 4,225,328 discloses an exchangeable filter element for use in nuclear installations to purify airstreams or gas streams which contain toxic or radioactive dust. The filter element includes a number of V-shaped filter pockets which are formed by filter layers made of filter paper. U.S. Pat. No. 4,359,330 discloses an air cleaning apparatus for removing dust from a flow of air which includes a housing wherein a plurality of filter assemblies are held in the flow of air by a clamping frame, and wherein inertial precleaner devices may be held for inertially separating heavy particulate matter from the air prior to filtration.

U.S. Pat. No. 4,080,185 discloses a composite filter set for placement across a gas flow path in an air conditioning duct, which includes a head frame and a number of filter pockets permanently joined to the head frame to clean dust from the gas. Finally, U.S. Pat. No. 4,865,636 discloses a pleated paper filter element which is used to filter the air intake on a diesel locomotive and which includes a plurality of pleated paper filter panels secured in a frame by V-shaped wedges such that they form plural wedge shaped air inlet and outlet spaces.

All of the above devices have the disadvantage, however, that they are adapted for the removal of relatively large substances, such as solid or liquid particles, from a fluid. Filter devices designed for this type of particle removal are generally very poor at removing chemical gases and odors from a fluid, since the size of the chemical molecules which need to be removed for gas and odor removal are so small that they easily pass through such filter devices.

Other devices are known in the prior art which are adapted to remove smaller molecules from a fluid stream. For example, U.S. Pat. No. 4,306,892 discloses a disposable tapered packet which includes an air freshening medium enclosed within the packet between two perforated walls, wherein the air freshening medium entraps odors from the air. The packet is held in the path of an air flow by a pair of lock tabs on an outer face. Also, U.S. Pat. No. 4,049,406 discloses a fluid filter housing and assembly for use in the adsorption of radioactive iodine in a fluid flow stream in a nuclear reactor installation. The filter assembly includes one or more filter elements which are foraminous containers made from a screen material which enclose carbon granules to adsorb the radioactive iodine.

However, such devices generally necessarily make use of filter material which is denser than filter material in other filter devices and which often needs to be used in a thicker layer than other filter materials. This arrangement results in a substantial pressure drop across such a filter device and a corresponding reduced fluid velocity through the filter device. Accordingly, smaller molecule filter devices need to be particularly concerned with minimizing the pressure drop thereacross, and the above-described prior art devices have the disadvantage that they fail to address such a concern.

SUMMARY OF THE INVENTION

In view of the above, it is an object of the present invention to provide an improved apparatus which can readily remove chemical gases from a fluid.

A further object of the present invention is to provide a chemical gas and odor filter apparatus which experiences a relatively minimal pressure drop thereacross in a fluid stream.

It is a further object of the present invention to provide a filter cartridge for filtering chemical gases and odors from a fluid which is easily replaceable in a filter apparatus.

It is a further object of the present invention to provide a table top air cleaner which includes the advantages of an improved chemical gas and odor filter apparatus.

Another object of the present invention is to provide a chemical gas and odor filter assembly which is easy to manufacture and assemble.

The above objects as well as other objects not specifically enumerated are accomplished by a filter apparatus in accordance with the present invention. The adsorbent filter apparatus of the present invention for adsorbing chemical gases from a fluid includes a plurality of filter cartridges which each include an adsorbent material and at least one wall which encloses the adsorbent material, wherein the at least one wall has holes therethrough such that the fluid may flow through the holes and contact the adsorbent material, and a housing including an upper plate, a lower plate, and fixing means for fixing the filter cartridges between the plates such that the filter cartridges are arranged in a W-shape, wherein each of the filter cartridges forms one leg of the W-shape.

The objects of the invention are also accomplished by a filter apparatus for filtering chemical gases from an fluid stream, which includes a housing through which the fluid stream flows, and a plurality of filter cartridges fixed inside the housing, wherein the filter cartridges each include a front wall, a back wall, a first side wall, a second side wall, and a filter material enclosed within the walls, wherein the walls each have holes therethrough, and wherein the housing fixes the filter cartridges therein such that the front walls and the first side walls of the filter cartridges oppose the fluid stream as the fluid stream flows through the housing such that the fluid stream flows into the filter cartridges through the holes in the front and first side walls, contacts the filter material, and flows out of the filter cartridges through the holes in the back and second side walls of the filter cartridges.

The above objects of the invention are further accomplished by a table top air cleaner for adsorbing chemical gases from air which includes a housing having an inlet opening and an outlet opening, means for drawing air into the housing through the inlet opening and for forcing the air out of the housing through the outlet opening such that the air forms an airstream through the housing, and a plurality of filter cartridges fixed inside the housing in the path of the airstream, wherein the filter cartridges each include an adsorbent material and at least one wall which encloses the adsorbent material, wherein the at least one wall has holes therethrough such that the airstream may flow through the holes and contact the adsorbent material, and wherein the housing further includes fixing means for fixing the filter cartridges relative to each other such that the filter cartridges are arranged in a W-shape such that each of the filter cartridges forms one leg of the W-shape.

The objects of the present invention are further accomplished by an adsorbent filter cartridge for adsorbing chemical gases from a fluid which includes a front wall, a back wall, a first side wall, a second side wall, and a substantially adsorptive filter material enclosed within the walls, wherein each of the walls has holes therethrough and is made of a material which is generally nonadsorptive of chemical gases and odors, such that the fluid may flow into the filter cartridge through the holes in the front and first side walls, contact the filter material such that chemical gases and odors carried by the fluid are adsorbed by the filter material, and flow out of the filter cartridge through the holes in the back and second side walls.

The objects of the present invention are also accomplished by a filter cartridge for filtering chemical gases from a fluid which includes first and second identical plastic wall units which are formed by injection molding and which each include at least one side wall having holes therethrough to allow the fluid to pass through the filter cartridge, a filter material, wherein the first and second wall units are fastened to each other such that they form a space therebetween with which the holes communicate, and such that they form an opening in the filter cartridge which communicates with the space such that the space may be filled with the filter material through the opening after the wall units have been fastened together, and a lid extending across the opening to close the opening after the space is filled with the filter material.

BRIEF DESCRIPTION OF THE DRAWINGS

FIG. 2 is a front view of the filter apparatus of FIG. 1;

FIG. 3 is a top view of the filter apparatus of FIG. 1 with a top cover thereof removed;

FIG. 4 is a side view of the filter apparatus of FIG. 3;

FIG. 5 is a detail view of a notch and groove connection between two filter cartridges of the filter apparatus;

FIG. 6 is a detail view of a notch and groove connection between a filter cartridge and a side panel of the filter apparatus;

FIG. 7 is a bottom view of the top cover of the filter apparatus;

FIG. 8 is a cross sectional view taken along line A—A of FIG. 7;

FIG. 9 is a front view of the side panel of the filter apparatus; FIG. 10 is a side view of the side panel of FIG. 9; FIG. 11 is a top view of the side panel of FIG. 9; FIG. 12 is a detail view of a notch and a groove of the side panel of FIG. 9; FIG. 16 is a perspective view of a wall unit of the filter cartridge of the present invention; FIG. 17 is a side view of the wall unit of FIG. 16; FIG. 18 is a top view of the wall unit of FIG. 16; FIG. 19 is a cross sectional view taken along line B—B of FIG. 17; FIG. 21 is a side view of the table top air cleaner of FIG. 20; FIG. 22 is a front view of the table top air cleaner of FIG. 20; FIG. 23 is a top view of the table top air cleaner of FIG. 20 with a cabinet top thereof removed; FIG. 24 is a top view of the table top air cleaner of FIG. 20 with the cabinet top and a control cover removed; FIG. 25 is a cross sectional view taken along line C—C of FIG. 23; FIG. 26 is a cross sectional view taken along line D—D of FIG. 23.

FIG. 30 is a top view of a bottom cover of the second embodiment of the filter apparatus;

FIG. 31 is a cross sectional view taken along line G—G of FIG. 30;

FIG. 32 is a side view of the bottom cover of FIG. 30;

FIG. 33 is a cross sectional view taken along line H—H of FIG. 30;

FIG. 34 is a cross sectional view taken along line I—I of FIG. 30;

FIG. 35 is a front view of a side panel of the second embodiment of the filter apparatus;

FIG. 36 is a top view of the side panel of FIG. 35;

FIG. 37 is a cross sectional view taken along line J—J of FIG. 35; and

FIG. 38 is a cross sectional view taken along line K—K of FIG. 35.

DETAILED DESCRIPTION

Figure 1:
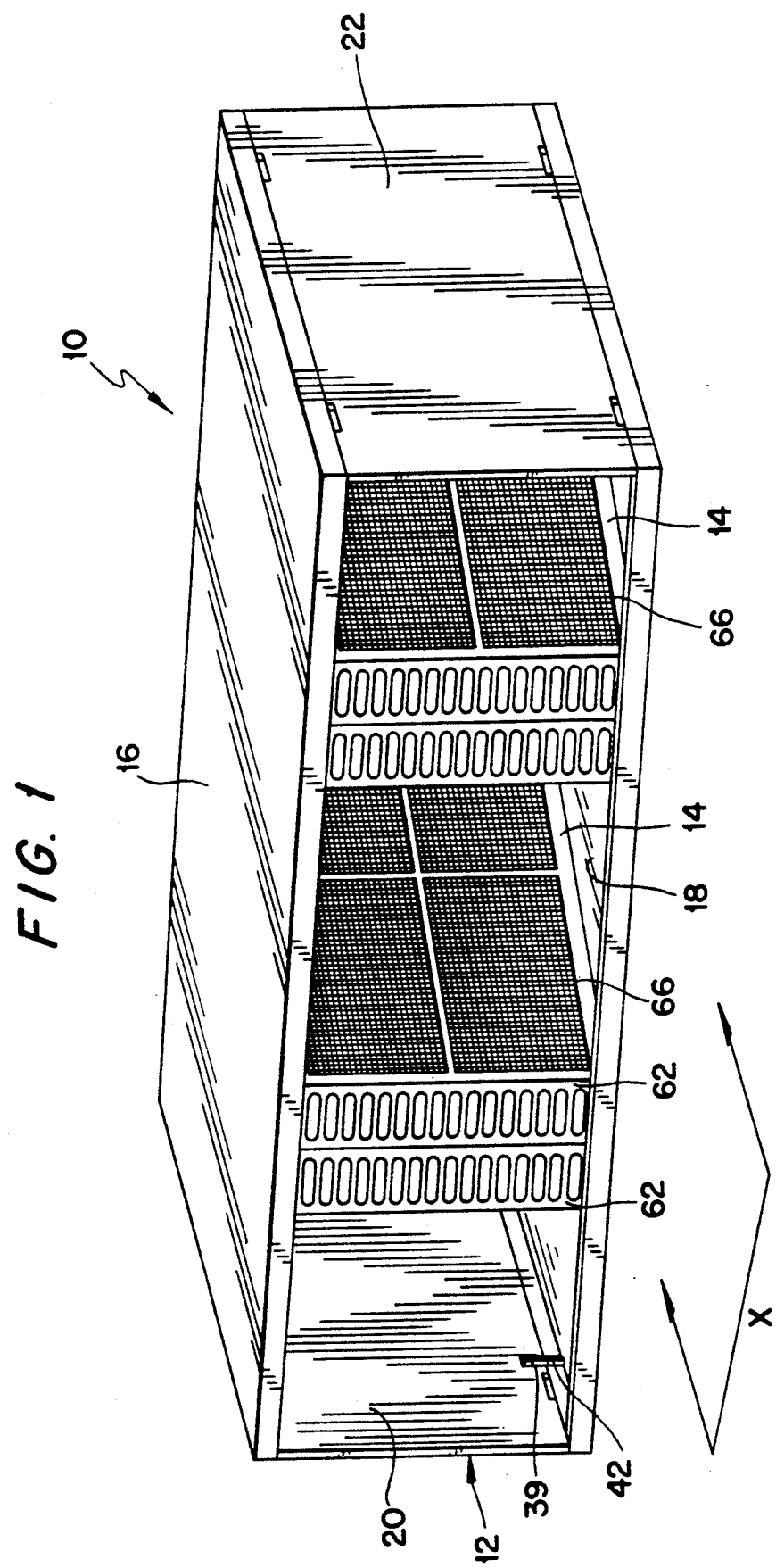
FIG. 1 is a perspective view of a filter apparatus of the present invention.

With reference to FIGS. 1-19, a filter apparatus 10 in accordance with an embodiment of the present invention includes a housing 12, and a plurality of filter cartridges 14 fixed inside the housing 12. As can be seen from FIGS. 1 and 2, the housing 12 is made up of a top cover 16, a bottom cover 18, and two side panels 20 and 22. The covers 16, 18 and the panels 20, 22 fit together to form a rectangular enclosure which houses the filter cartridges 14 such that they are fixed therein in a W-shape with each of the filter cartridges 14 forming a leg of the W-shape, as will be explained further hereinbelow.

The top cover 16 and the bottom cover 18 of the housing 12 are in all respects identical, and so only the top cover 16 is described hereinbelow in detail, with the understanding that the description of the top cover 16 applies equally well to the bottom cover 18. As can be seen from FIGS. 7 and 8, the top cover 16 includes a rectangular upper plate 24, a plurality of edge flanges 26 extending out from the edges of the upper plate 24, and a plurality of flanges 28 extending out from the upper plate to form a W-shaped groove 30 on the upper plate 24. The top cover 16 also includes a plurality of sockets 32 which extend inwardly from the edge flanges 26 and present a plurality of holes 34 which extend generally perpendicularly to the upper plate 24.

The side panels 20 and 22 are also in most respects identical, although they are actually mirror images of each other, and accordingly only the side panel 22 will be described in detail hereinbelow. As shown in FIGS. 9-12, the side panel 22 includes a side plate 36 which forms a side wall 38 on its inside surface. A plurality of sockets 39 extend out from the side wall 38 and each includes a pin 40 which extends upwardly or downwardly from the side panel 22. The pins 40 extend upwardly into the holes 34 in the sockets 32 of the upper cover 16, and extend downwardly into holes in sockets 42 of the bottom cover 18 (shown in FIG. 1), to fasten the housing 12 together. The side panel 22 also includes a plurality of notches 44 in the upper and lower edges thereof, so that a tool may be inserted into the notches 44 when the housing 12 is assembled to allow the top or bottom covers 16, 18 to be removed. The side panel 22 also includes a tongue 46 and a groove 48 on and in the side wall 38, whose function will be described hereinbelow.

Figure 13:
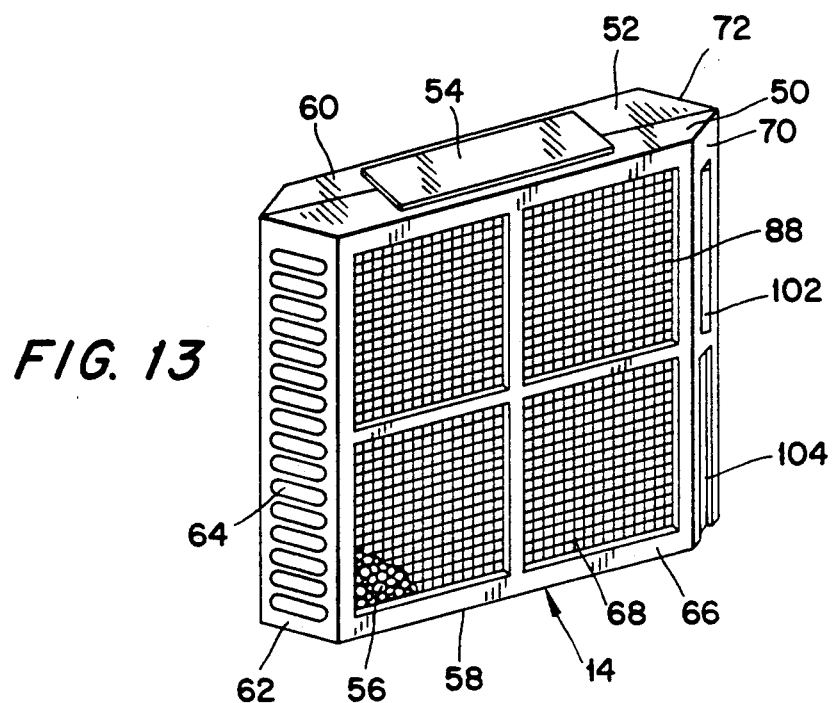
FIG. 13 is a perspective view of a filter cartridge for use in the filter apparatus of the present invention.
Figure 14:
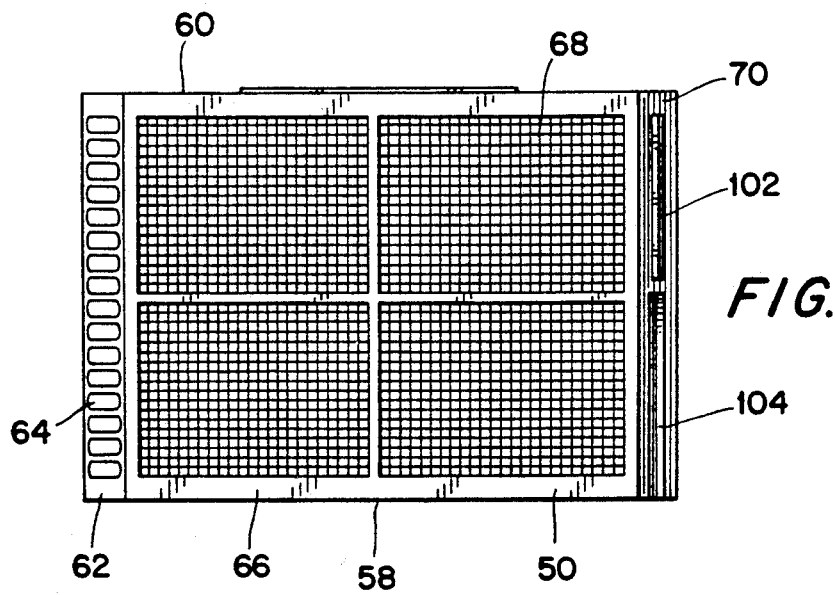
FIG. 14 is a side view of the filter cartridge of FIG. 13.
Figure 15:
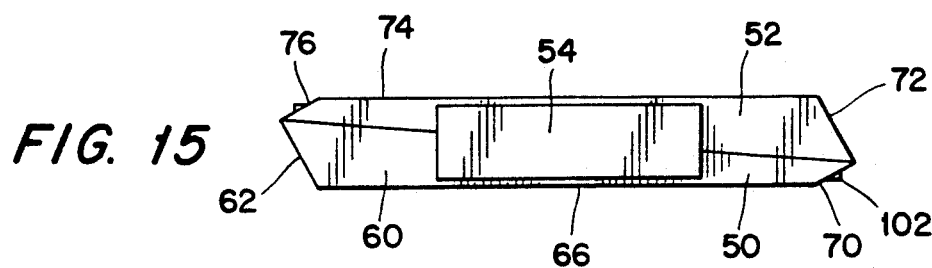
FIG. 15 is a top view of the filter cartridge of FIG. 13.

As can be seen from FIGS. 13-15, a filter cartridge 14 includes a pair of identical, plastic, injection molded wall units, i.e., first wall unit 50 and second wall unit 52, and a lid 54. The first and second wall units 50, 52 and the lid 54 enclose an adsorptive filter material (shown generally at 56) which is adsorptive of chemical gases and odors. The first wall unit 50 and the second wall unit 52 cooperate to form a bottom wall 58, and cooperate with the lid 54 to form a top wall 60 of the filter cartridge 14. In addition, the first wall unit 50 forms a front wall 62 having holes 64 therethrough, a first side wall 66 having holes 68 therethrough, and a first end wall 70 of the filter cartridge 14. The second wall unit 52 forms a back wall 72 having holes therethrough, a second side wall 74 having holes therethrough, and a second end wall 76 of the filter cartridge 14.

As described above, the first end second wall units 50, 52 are identical, and thus only the first end wall unit 50 will be described in greater detail hereinbelow. As is shown in FIGS. 16-19, the first wall unit 50 is an injection molded plastic wall unit which includes a side portion 78 having holes 80 therethrough, a front wall 62, a first end wall 70, a top portion 82 having a notch 84 therein, and a bottom portion 86. As seen in FIG. 13, a screen 88 having the holes 68 therethrough is attached to the inside of the side portion 78 so that together the side portion 78 and the screen 88 form the first side wall 66 of the filter cartridge 14. As seen in FIGS. 16-19, the first wall unit 50 also includes a plurality of first sockets 90 having pins 92 extending therefrom, and a plurality of second sockets 94 having holes 100 therein, so that the first wall unit 50 may be fastened to the second wall unit 52 via identical structure on the second wall unit 52. In addition, the first wall unit 50 includes a tongue 102 and a groove 104 located on and in the first end wall 70, respectively, whose function will be described hereinbelow.

With reference to FIGS. 1-19, the structure and operation of the filter apparatus 10 will now be described. Each of the filter cartridges 14 is first formed by the following steps. The screen 88 is first attached to the inside surface of the side portion 78 of the first wall unit 50 by a fastening means such as an adhesive, solvent welding, or any other suitable fastening means, to cover the holes 80. A screen is also attached to an inside surface of a side portion of the second wall unit 52 to cover holes therethrough. The first and second wall units 50, 52 are then fastened to each other by means of the pins 92 of the first wall unit 50 extending into the holes in the second wall unit 52 and by means of pins of the second wall unit 52 extending into the holes 100 of the first wall unit 50. The pins may be secured in their respective holes by an adhesive, solvent welding, thermoplastic bonding, or any other suitable fastening means.

When the first and second wall units 50, 52 are fastened together, they form a space therebetween by virtue of their shape, and they form an opening in the top wall 60 of the filter cartridge 14 by virtue of the juxtaposition of the notch 84 of the first wall unit 50 and a similar notch in the second wall unit 52. The adsorbent filter material 56, which may be activated carbon, activated alumina, Purafil, a combination of the above adsorbent materials, or any other suitable adsorbent material, is then poured into the space between the first and second wall units 50, 52 through the opening in the top wall 60 which communicates with the space, until the space is filled. The lid 54 is then fastened to the first and second wall units 50, 52 to cover the above-described opening and complete the top wall 60 of the filter cartridge 14.

The filter apparatus 10 is then assembled as follows. As shown in FIGS. 1-6, a plurality of the filter cartridges 14 and the pieces of the housing 12 form the filter apparatus 10. As is shown in FIG. 3, the filter cartridges 14 are arranged in the housing in a W-shape, with each filter cartridge 14 forming a leg of the W-shape. The filter cartridges 14 are fixed in the W-shape in the housing 12 by the flanges 28 of the top cover 16 and similar flanges 110 of the bottom cover 18 which extend along and contact upper and lower portions of the first and second side walls 66, 74 of each filter cartridge 14, and by the edge flanges 26 of the top cover 16 and similar edge flanges 112 of the bottom cover 18 which extend along and contact upper and lower portions of the front and back walls 62, 72 of each filter cartridge 14.

The filter cartridges 14 are also fixed in the housing 12 by the contact between adjacent first and second end walls 70, 76 of adjacent filter cartridges 14, and between the side panels 20, 22 and first and second end walls 70, 76 of filter cartridges 14 which are adjacent the side panels 20, 22, respectively. At these contacts, tongue and groove connections also help to fix the filter cartridges 14 in the housing 12 in the W-shape.

For example, as is shown in the detail view of FIG. 5, adjacent filter cartridges 14' and 14" are arranged such that one is right side up and the other is upside down, such that the first end wall 70' of the filter cartridge 14' is located adjacent the second end wall 76" of the filter cartridge 14". Thus, a groove 104' on the first end wall 70' is adjacent to and therefore accomodates therein a tongue 120" located on the second end wall 76", and a groove on the second end wall 76" below the tongue 120" is adjacent to and accomodates therein a tongue on the first end wall 70' below the groove 104' to fix the filter cartridges 14' and 14" relative to each other. Also, as is shown in the detail view of FIG. 6, a filter cartridge 14a adjacent the side panel 22 is located such that the first end wall 70a thereof is adjacent the side panel 22 such that a tongue 102a on the first end wall 70a is accommodated in the groove 48 in the side wall 38 of the side panel 22, and such that the tongue 46 on the side wall 38 below the groove 48 is accommodated in a groove 104a in the first end wall 70a below the tongue 102a. The tongue-and-groove connections between adjacent filter cartridges 14 and between filter cartridges 14 and side panels 20, 22 acts both to help fix the filter cartridges 14 in the housing 12 in the W-shape, as well as to reduce fluid flow between adjacent filter cartridges 14 and between the filter cartridges 14 and the side panels 20, 22.

In operation, then, the filter apparatus 10 is assembled and is placed in the path (shown generally by arrows X in FIG. 1) of a fluid flow which is desired to be filtered. As can be appreciated from FIGS. 1-3, the filter cartridges 14 are arranged in the W-shape in the housing 12 such that the front walls 62 and the first side walls 66 of each filter cartridge 14 oppose the flow X of fluid toward the filter apparatus 10. The first side walls 66 of all of the filter cartridges 14 oppose the fluid flow X, since every other filter cartridge 14 is oriented upside down in the housing 12. Accordingly, each of the filter cartridges 14 forms a leg of the W-shape, each of the front walls 62 of the filter cartridges 14 cooperates with an adjacent front wall 62 to form a foot of the W-shape, and each of the back walls 72 of the filter cartridges 14 forms a head of the W-shape.

As the fluid flow enters the housing 12 the fluid is constricted to flow within the enclosure formed by the top cover 16, the bottom cover 18, and the side panels 20, 22. The fluid is therefore forced to flow into the filter cartridges 14 through the holes 64 in the front walls 62 and the holes 68 in the first side walls 66, flow through and contact the adsorbent filter material 56, and flow out of the filter cartridges 14 through the holes in the back walls 72 and the second side walls 74. Chemical gases, especially gases causing odors, which are carried in the fluid flow are therefore adsorbed from the fluid by the adsorbent filter material 56 as the fluid flows therethrough, and the fluid thus exits the filter apparatus 10 with substantial amounts of the undesirable chemical gases and odors being adsorbed by the filter material.

During use, the filter material 56 of a filter cartridge 14 will periodically reach a point where it has adsorbed such an amount of chemical gases and odors that it has very little surface area left for adsorption and the filter material 56 will no longer efficiently adsorb chemical gases and odors from the fluid. When this occurs, the filter cartridge 14 may be changed as follows. A tool is inserted into the notches 44 in the side panels 20, 22 one by one to pry either the top cover 16 or the bottom cover 18 off of the pins 40 of the side panels 20, 22 to thereby remove the top or bottom cover from the filter apparatus 10. The dirty filter cartridge 14 is then pulled out of the housing 12, and a new filter cartridge 14 is put in its place. The top or bottom cover is then replaced by forcing it back onto the pins 40 of the side panels 20, 22, and the filter apparatus is ready for further use.

It is to be appreciated that the W-shape in which the filter cartridges are arranged in the housing is designed to reduce the pressure drop in the fluid across the filter apparatus as much as possible, while still maintaining efficient gas and odor adsorption. Specifically, the W-shape of the filter cartridges increases the surface area of the filter cartridges which are opposed to the fluid flow, so that the interfacial velocity of the fluid is decreased for efficient gas and odor adsorption. However, the holes through the front and back walls of the filter cartridges minimize the pressure loss across the filter apparatus which results from the reduced fluid velocity because a greater volume of fluid may flow through the filter cartridges over time due to the existence of the holes in the front and back walls of the filer cartridges. The W-shaped arrangement of the filter cartridges also has the advantage that it is symmetrical about its central plane, so that the top and bottom covers can be made identical, thus reducing the cost of manufacturing the filter apparatus.

It is to be understood that various changes may be made to the present invention without exceeding the scope thereof. For example, instead of constructing the filter cartridges 14 with a particulate filter material 56 which is poured into the filter cartridges 14 after the first and second wall units 50, 52 are assembled, the filter cartridges 14 may be constructed with a solid piece of filter material which is placed between the first and second wall units before they are assembled. In such an embodiment, the lid 54 could be eliminated, since the filter cartridge wall units could be formed without notches which form an opening in a top wall of the filter cartridge, and the screens 88 could be eliminated, since the filter material would be adequately held by the plastic portions of the filter cartridge side walls. Also, it is to be understood that, while the filter cartridges 14 are disclosed as being six-sided, any number of elongated shapes may be used for the filter cartridges, such as rectangular, elliptical, etc., as long as they present a W-shape surface to the fluid flow.

Almost any releasable fastening means could be used to fasten the top and bottom covers 16, 18 to the side panels 20, 22. For example, screws, hooks, velcro, or other fastening means may be used instead of the pin and hole connections disclosed. Also, the filter cartridges and the housing are disclosed as being formed from plastic, but other materials such as metal may be used instead if desired. Additionally, the filter cartridges may be arranged in a single V-shape or any multiple of V-shapes or W-shapes if desired, and advantages obtained therefrom. The tongue-and-groove connections between adjacent filter cartridges and between filter cartridges and side panels may be eliminated if desired to increase the ease with which the filter cartridges may be replaced.

With reference to FIGS. 20-28, a table top air cleaner 200 which employs a filter apparatus 202 according to the present invention is described.

Figure 20:
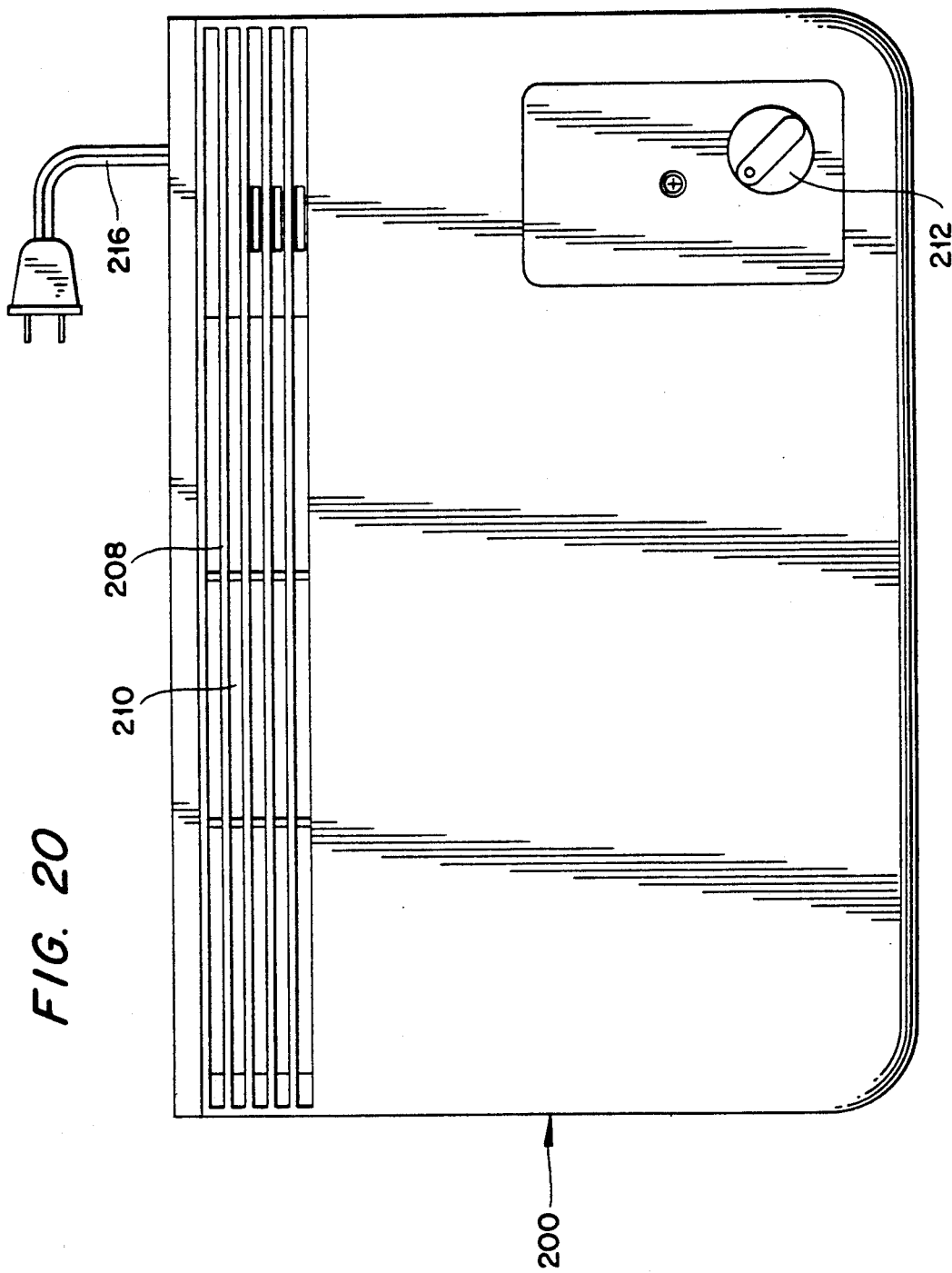
FIG. 20 is a top view of a table top air cleaner employing the filter apparatus of the present invention.

The table top air cleaner 200, as is shown in FIGS. 20-22, includes a first grill 204 covering an inlet opening 206 in a front side of the air cleaner 200, a second grill 208 covering an outlet opening 210 in the top of the air cleaner 200, a switch 212 for turning the air cleaner 200 on and off, and a power cord 216 for supplying power to air cleaner 200.

Figure 27:
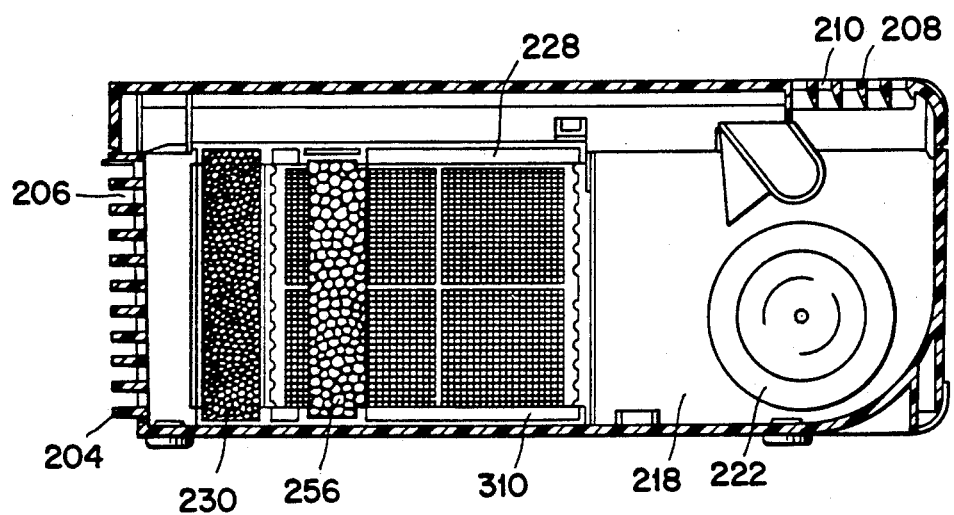
FIG. 27 is a cross sectional view taken along line E—E of FIG. 24.
Figure 28:
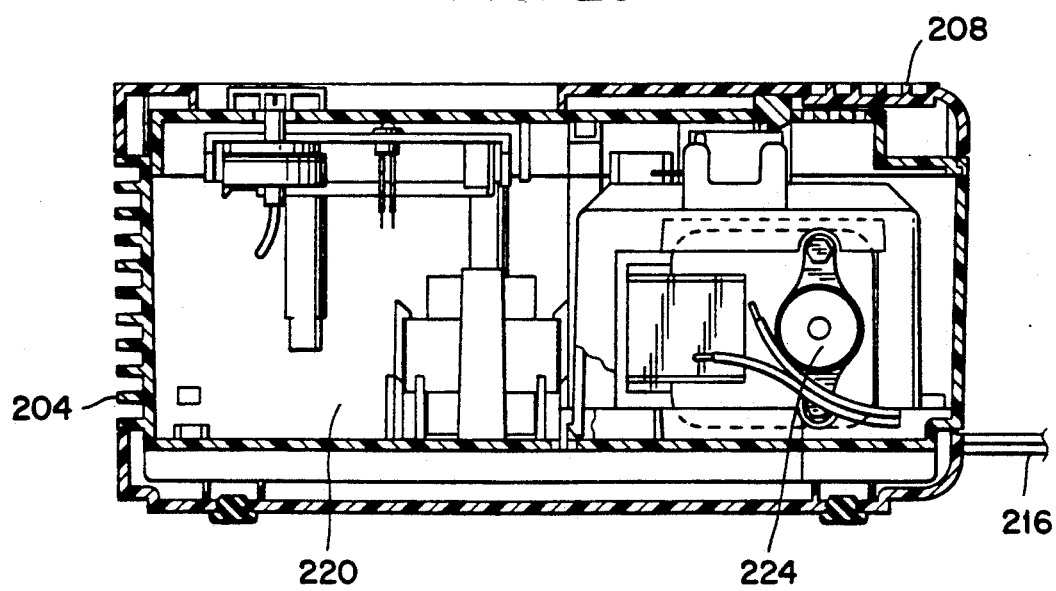
FIG. 28 is a cross sectional view taken along line F—F of FIG. 23.
Figure 29:
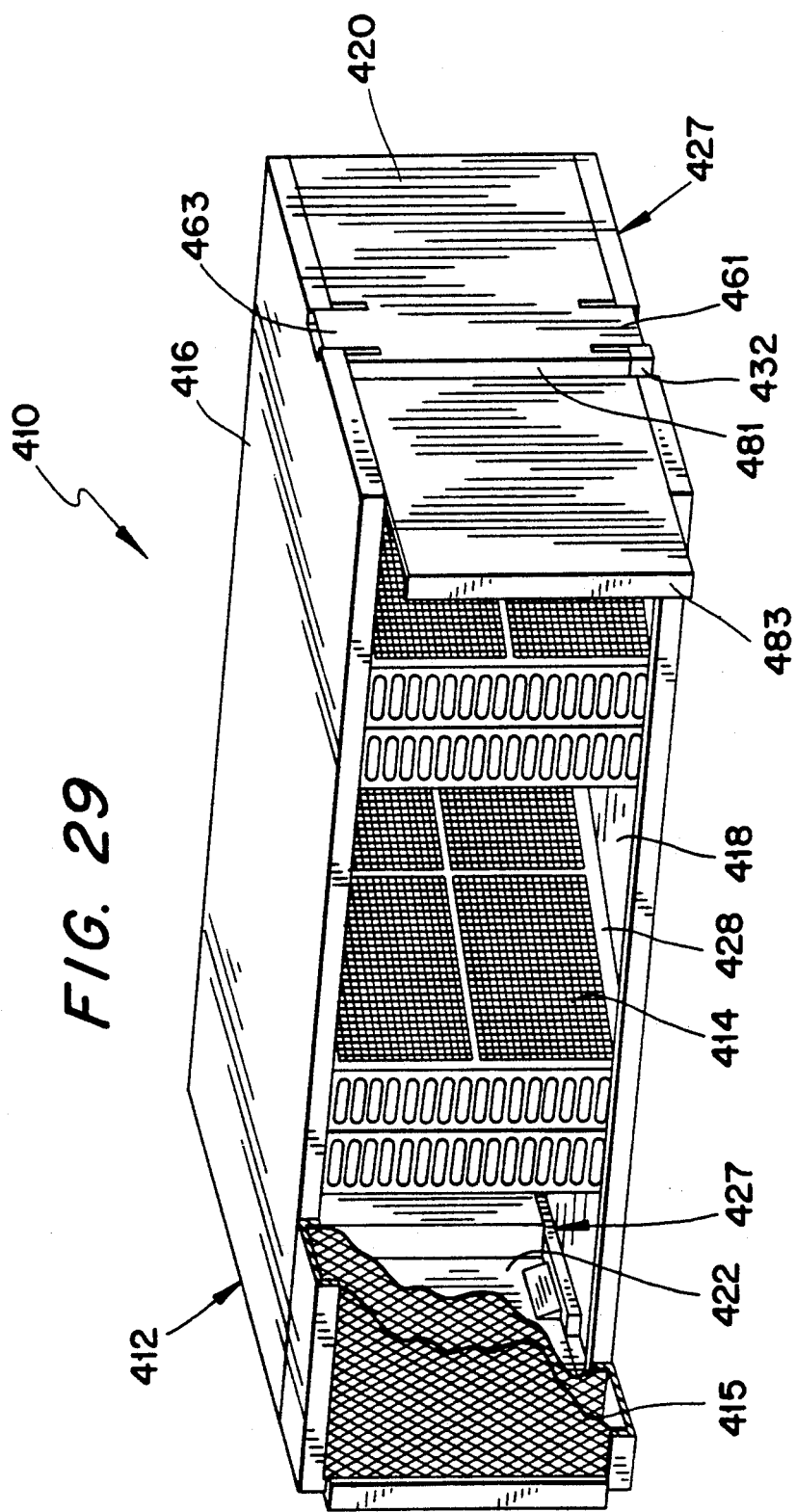
FIG. 29 is a perspective view of a second embodiment of the filter apparatus of the present invention.

As can be seen from FIGS. 23 and 24, the air cleaner 200 includes the filter apparatus 202, a blower section 218 in which a blower is housed, and a control section 220 in which the air cleaner electronics and controls are housed. As can be seen in FIG. 27, the filter apparatus 202 and the blower section 218 form part of an air flow path through the cleaner, in which air is drawn into the air cleaner 200 through the inlet opening 206, flows through the filter apparatus 202, and is forced out of the air cleaner 200 through the outlet opening 210 by the blower in the blower section 218. As is shown in FIGS. 25, 27, and 28, the blower 222 is driven by a motor 224 in the control section 220 through a shaft 226.

As can be seen from FIGS. 26 and 27, the filter apparatus 202 of the air cleaner 200 is constructed in accordance with the present invention, and includes a plurality of filter cartridges 214 containing an adsorbent filter material 256 and arranged within the housing of the air cleaner 200 in a W-shape, with each of the filter cartridges 214 forming a leg of the W-shape. A top cover 217 and a bottom cover 219, which are part of the air cleaner housing, have flanges 228, 310 extending therefrom, respectively, along upper and lower portions of the filter cartridges 214 to fix the filter cartridges 214 in the W-shape. The filter apparatus 202 is constructed identically to the filter apparatus 10 in all respects, with the one exception that the filter cartridges 214 are shown as being formed without tongues or grooves, to increase the ease with which the filter cartridges 214 may be changed.

As shown in FIG. 27, a precleaner 230 is located in the air flow path between the inlet opening 206 and the filter apparatus 202. The precleaner is adapted to remove heavy particulate materials from the air before they reach the filter apparatus 202, so that such particulate materials do not unnecessarily clog the filter apparatus 214.

With reference to FIGS. 20-28, the operation of the table top air cleaner 200 will be described. When the switch 212 is turned to the ON position, power is supplied to the motor 224 from the power cord 216, which is connected to an exterior power supply. The motor 224 thereby rotates the blower 222 through the shaft 226 at a relatively high speed. Rotation of the blower 222 draws air into the air cleaner 200 through the inlet opening 206, draws the air through the precleaner 230 and the filter apparatus 202 in the same manner as described above for filter apparatus 10, and forces the air out of the air cleaner 200 through the outlet opening 210. Since chemical gases, especially gases causing odors, which are contained in the air as it enters the inlet opening 206 are adsorbed from the air by the adsorbent filter material 256 as the air passes through the filter cartridges 214, the air is thereby cleaned.

It should be understood that several modifications to the table top air cleaner are within the scope of the present invention, as well as other modifications not specifically mentioned. For example, the air cleaner may be constructed with the positions of the filter apparatus and the blower section reversed, such that the blower forces air into the filter apparatus, rather than drawing air through the filter apparatus. Also, the position of the motor relative to the blower may be moved to positions above or below the blower section, wherein the motor may then drive the blower via a belt or gear system. In addition, tongues and grooves may be used on the filter cartridges if desired.

With reference to FIGS. 29-38, a second embodiment of the filter apparatus of the present invention will be described hereinbelow. A filter apparatus 410 according to the second embodiment includes a housing 412 which houses both a plurality of filter cartridges 414 and a prefilter 415. Like the housing 12 of the first embodiment, the housing 412 includes a top cover 416, a bottom cover 418, a side panel 420, and a side panel 422. The filter cartridges 414 are identical to the filter cartridges 14 of the first embodiment, except that they do not include the tongues and grooves of the first embodiment. As will be explained hereinbelow, the top cover 416 is substantially identical to the bottom cover 418, and the side panel 422 is a substantial mirror image of the side panel 420. Accordingly, only the bottom cover 418 and the side panel 420 are shown and described in detail.

The top and bottom covers 416, 418 and the two side panels 420, 422 fit together to form the housing 412, and they enclose the filter cartridges 414 in the same manner as the housing 12 encloses the filter cartridges 14, i.e., in a W-shape. The housing 412 also functions to house the prefilter 415 along a front of the housing 412, as will be described further hereinbelow.

With reference to FIGS. 30-34, the bottom cover 418 of the housing 412 includes a rectangular lower plate 424, a pair of edge flanges 426 extending upwardly from the lower plate 424 along front and rear edges of the lower plate 424, and a pair of edge flanges 427 extending upwardly from the lower plate 424 along either side edge of the lower plate 424. The bottom cover 418 also includes a plurality of flanges 428 extending upwardly from the lower plate 424, as shown in FIG. 33, to form a W-shaped groove 430 in which are received the filter cartridges 414 when the housing 412 is assembled.

In contrast to the edge flanges of the bottom cover 18 of the housing 12, the edge flanges 427 each include two slots 429, 431 therein which are defined by edge flange portions 433, 435 and 437, 439, respectively, and a retaining shoulder 441 (shown in FIG. 34) located between the two slots 429, 431. The edge flange 427 on the right-hand side of FIG. 31 also includes a channel-shaped edge flange portion 432 located between the retaining shoulder 441 and the slot 431. The two slots 429, 431 and the retaining shoulder 441 of each edge flange portion 427 coact with portions of a respective side panel 420, 422 to latch the bottom cover 418 and a side panel together, as will be described hereinbelow.

With reference to FIGS. 35-38, the side panel 420 includes a side plate 436 which forms a side wall 438 on its inside surface. Extending inwardly and downwardly from the side wall 438 are two elongated extensions 451, 453, and extending inwardly and upwardly from the side wall 438 are two elongated extensions 455, 457. The extension 451, which is representative of the other elongated extensions, is shown in cross section in FIG. 37. The side panel 420 also includes a latch extension 461 extending downwardly from the side plate 436 between the elongated extensions 451, 453, a latch extension 463 extending upwardly between the elongated extensions 455, 457, a channel-shaped wall portion 481 running the height of the side panel 420, and a securing flange 483 extending outwardly from a front edge of the side wall 438.

The latch extensions 461, 463 are defined partially by pairs 465, 467, and 475, 477 of grooves, respectively, which extend through the side plate 436, and each latch extension 461, 463 includes a latch shoulder 469, 471 thereon, respectively, which includes a slanted surface 485, 487. The extension 461, which is representative of the extension 463, is shown in cross section in FIG. 38. As can be seen from FIG. 38, the latch shoulder 469 extends inwardly from the side wall 438.

With reference to FIGS. 30-38, the manner in which the filter apparatus 410 is constructed in accordance with the second embodiment will now be described. First, the bottom cover 418 is placed right side up, as shown in FIG. 30, and the two side panels 420, 422 are attached to the edge flanges 427 of the bottom cover 418. The side panel 420, for example, is attached to the bottom cover 418 as follows. The elongated extensions 451, 453 of the side panel 420 are slid down into the slots 428, 431 between the edge flange portions 433, 435 and 437, 439, respectively, of the edge flange 427. As this sliding motion occurs, the slanted portion 485 of the latch shoulder 469 comes into contact with the retaining shoulder 441. Further sliding movement downwardly causes the latch extension 461 to be pushed outwardly, which is possible due to an inherent elasticity of the latch extension 461 which arises from the existence of the grooves 465, 467 separating the latch extension 461 from the side plate 436. Once the latch shoulder 469 passes the retaining shoulder 441, the latch extension 461 snaps back inwardly and the latch shoulder 469 engages the underside of the retaining shoulder 441 to latch the side panel 420 to the bottom cover 418.

The side panel 422, which is a mirror image of the side panel 420 except that the side panel 422 does not include a channel-shaped wall portion, is similarly latched to the left side of the bottom cover 418, and the filter cartridges 414 are then slid into the W-shaped groove 430. The top cover 416, which is identical to the bottom cover 418 except that it does not include a channel-shaped edge flange portion, is then snapped onto the top edges of the side panels 420, 422. Finally, the prefilter 415 is slid between the side panels 420, 422 such that it is held by the front edge flanges of the top and bottom covers 416, 418 and the securing flanges of the side panels 420, 422. Assembly of the filter apparatus 410 is then complete.

The extension-and-slot and latching connections which connect the side panels 420, 422 and the top and bottom covers 416, 418 provide a very secure, stable connection system for the housing, and provide a connection system which requires that the parts be made to only a low degree of tolerance. In addition, when a user needs to remove the top cover of the housing to replace the filter cartridges, it is easy for the user to see how to disconnect the top cover from the side panels. All the user need do is push the upper latch shoulders on each of the side panels outwardly, and pull the top cover upwardly off of the housing. The connection system in accordance with the second embodiment of the housing is thus simple, secure, and easy to manufacture and use.

The channel-shaped wall portion 481 of the side panel 420 and the channel-shaped edge flange portion 432 also provide an important advantage of the filter apparatus 410. The two portions 432, 481 allow the filter apparatus 410 to be used in a ventilation system or a table top air cleaner which includes a locking fin of a size corresponding to the inner dimensions of the channel-shaped portions 432, 481. The locking fin is designed as an elongated fin jutting out into a space in which the filter apparatus 410 is to be housed, and the filter apparatus 410 is placed in the space by sliding the filter apparatus 410 into the space such that the locking fin slides into the channel-shaped portions 432, 481. The fin and channel-shaped portions 432, 481 thus lock the filter apparatus 410 into the space, and, since the channel-shaped portions 432, 481 are located only on one side of the filter apparatus 410, they ensure that a user will always replace the filter apparatus 410 in the space in a correct orientation.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

I claim:

1. An adsorbent filter apparatus for adsorbing chemical gases from a fluid, comprising:
   a plurality of filter cartridges each including an adsorbent material and at least one wall which encloses said adsorbent material, said at least one wall having holes therethrough such that the fluid may flow through said holes and contact said adsorbent material; and
   a housing including an upper plate, a lower plate, and fixing means for fixing said filter cartridges between said plates such that said filter cartridges are arranged in a W-shape, each of said filter cartridges forming one leg of said W-shape;
   each of said filter cartridges including a front wall, a back wall, a first side wall, and a second side wall, said filter cartridges being arranged such that said front walls form feet of said W-shape and thereby face toward the incoming flow of fluid; each of said first and second side walls having holes therethrough; each of said filter cartridges including a first end wall disposed between said back wall and said first side wall, and a second end wall disposed between said front wall and said second side wall, said first end wall forming an angle with said first side wall and with said back wall, said second end wall forming an angle with said second side wall and with said front wall; adjacent pairs of said filter cartridges being arranged such that their respective second end walls are mutually parallel and in engagement with one another, and their respect first end walls are mutually parallel and in engagement with one another.

2. An adsorbent filter apparatus as claimed in claim 1, wherein said fixing means includes a plurality of flanges formed on said upper and lower plates, said flanges extending along upper and lower portions of sides of each of said filter cartridges and thereby forming a W-shape groove on said upper plate and said lower plate to hold said filter cartridges in said W-shape.

3. An adsorbent filter apparatus as claimed in claim 1, wherein said housing further includes side walls releasably joining said upper plate to said lower plate, each of said side walls including a latch extension thereon latching said upper plate to said side wall, said latch extensions being releasable such that said upper plate can be separated from said housing to allow replacement of said filter cartridges.

4. An adsorbent filter apparatus as claimed in claim 1, wherein said filter cartridges each include a tongue and a groove on either end thereof, and said housing includes side walls each having a tongue and a groove therein, said tongues and grooves of said filter cartridges mating with grooves and tongues of adjacent filter cartridges, and said tongues and grooves of said side walls mating with grooves and tongues of filter cartridges which are adjacent said side walls, to thereby secure said filter cartridges to each other and to said housing, and to reduce a flow of the fluid between said filter cartridges.

5. An adsorbent filter apparatus as claimed in claim 1 wherein said front and back walls have holes therethrough.

6. An adsorbent filter apparatus as claimed in claim 1, wherein said mutually engaging first end walls are interconnected by a tongue-and-groove connection, and said mutually engaging second end walls are interconnected by a tongue-and groove connection.

7. An adsorbent filter apparatus as claimed in claim 6, wherein each of said first and second end walls includes both a tongue and groove.

8. An adsorbent filter apparatus as claimed in claim 1, wherein said adjacent pairs of filter cartridges are arranged such that their front walls are parallel and their back walls are parallel.

9. A filter apparatus for filtering chemical gases from a fluid stream, comprising:
a housing through which the fluid stream flows; and
a plurality of filter cartridges fixed inside said housing, said filter cartridges each including a front wall, a back wall, a first side wall, a second side wall, and a filter material enclosed within said walls, wherein said walls each have holes therethrough,
said housing fixing said filter cartridges therein such that said front walls and said first side walls of said filter cartridges oppose the fluid stream as the fluid stream flows through said housing such that the fluid stream flows into said filter cartridges through said holes in said front and first side walls, contacts said filter material, and flows out of said filter cartridges through said holes in said back and second side walls of said filter cartridges;
each of said filter cartridges including a front wall, a back wall, a first side wall, and a second side wall, said filter cartridges being arranged such that said front walls form feet of said W-shape and thereby face toward the incoming flow of fluid; each of said first and second side walls having holes therethrough; each of said filter cartridges including a first end wall disposed between said back wall and said first side wall, and a second end wall disposed between said front wall and said second side wall, said first end wall forming an angle with said first side wall and with said back wall, said second end wall forming an angle with said second side wall and with said front wall; adjacent pairs of said filter cartridges being arranged such that their respective second end walls are mutually parallel and in engagement with one another, and their respect first end walls are mutually parallel and in engagement with one another.

10. A filter apparatus as claimed in claim 9, wherein said housing includes an upper plate, a lower plate, and a plurality of flanges extending outwardly from said upper plate and said lower plate to form W-shaped grooves on said plates, said flanges extending along upper and lower portions of said first and second side walls of each of said filter cartridges to thereby fix said filter cartridges in a W-shape in said housing.

11. A filter apparatus as claimed in claim 9, wherein said housing further includes an upper plate, a lower plate, and side walls releasably joining said upper plate to said lower plate, each of said side walls including a latch extension thereon latching said upper plate to said side wall, said latch extensions being releasable such that said upper plate can be separated from said housing to allow replacement of said filter cartridges.

12. An adsorbent filter apparatus as claimed in claim 9, wherein said filter cartridges each include a tongue and a groove on either end thereof, and said housing includes side walls each having a tongue and a groove therein, said tongues and grooves of said filter cartridges mating with grooves and tongues of adjacent filter cartridges, and said tongues and grooves of said side walls mating with grooves and tongues of filter cartridges which are adjacent said side walls, to secure said filter cartridges to each other and to said housing, and to reduce a flow of the fluid stream between said filter cartridges.

13. A filter apparatus as claimed in claim 9, wherein said front and back walls have holes therethrough.

14. A filter apparatus as claimed in claim 9, wherein said mutually engaging first end walls are interconnected by a tongue-and-groove connection, and said mutually engaging second end walls are interconnected by a tongue-and-groove connection.

15. A filter apparatus as claimed in claim 14, wherein each of said first and second end walls includes both a tongue and a groove.

16. A filter apparatus as claimed in claim 9, wherein said adjacent pairs of filter cartridges are arranged such that their front walls are parallel and their back walls are parallel.

17. A table top air cleaner for adsorbing chemical gases from air, comprising:
a housing including an inlet opening and an outlet opening;
means for drawing air into said housing through said inlet opening and for forcing the air out of said housing through said outlet opening such that the air forms an airstream through the housing; and
a plurality of filter cartridges fixed inside said housing in the path of the airstream, said filter cartridges each including an adsorbent material and at least one wall which encloses said adsorbent material, said at least one wall having holes therethrough such that the airstream may flow through said holes and contact said adsorbent material,
wherein said housing further includes fixing means for fixing said filter cartridges relative to each other such that said filter cartridges are arranged in a W-shape, each of said filter cartridges forming one leg of said W-shape;
each of said filter cartridges including a front wall, a back wall, a first side wall, and a second side wall, said filter cartridges being arranged such that said front walls form feet of said W-shape and thereby face toward the incoming flow of fluid; each of said first and second side walls having holes therethrough; each of said filter cartridges including a first end wall disposed between said back wall and said first side wall, and a second end wall disposed between said front wall and said second side wall, said first end wall forming an angle with said first side wall and with said back wall, said second end wall forming an angle with said second side wall and with said front wall; adjacent pairs of said filter cartridges being arranged such that their respective second end walls are mutually parallel and in engagement with one another, and their respect first end walls are mutually parallel and in engagement with one another.

18. A table top air cleaner as claimed in claim 9, wherein said housing further includes an upper plate and a lower plate, and wherein said fixing means includes a plurality of flanges formed on said upper and lower plates, said flanges extending along upper and lower portions of sides of each of said filter cartridges and thereby forming a W-shape groove on said upper plate and said lower plate to hold said filter cartridges in said W-shape.

19. A table top air cleaner as claimed in claim 17, wherein said air drawing and forcing means includes a blower for drawing air through said inlet opening and for forcing air out of said outlet opening, and a motor for driving said blower.

20. A table top air cleaner as claimed in claim 19, wherein said filter cartridges are located adjacent said inlet opening, and said blower is located adjacent said outlet opening.

21. A table top air cleaner as claimed in claim 19, wherein said blower and said filter cartridges are located in a space in said housing through which the airstream is constrained to flow, and said motor is located in said housing outside of said space, said motor being drivingly connected to said blower by a shaft.

22. A table top air cleaner as claimed in claim 19, further including a prefilter located in said housing between said inlet opening and said filter cartridges, said prefilter for removing coarse airborne particulates from the airstream.

23. An adsorbent filter cartridge for adsorbing chemical gases from a fluid, comprising:
a front wall;
a back wall;
a first side wall;
a second side wall, wherein each of said walls has holes therethrough and is made of a material which is generally nonadsorptive of chemical gases and odors; and
a substantially adsorptive filter material enclosed within said walls such that the fluid may flow into said filter cartridge through said holes in said front and first side walls, contact said filter material such that chemical gases and odors carried by the fluid are adsorbed by said filter material, and flow out of said filter cartridge through said holes in said back and second side walls;
said filter cartridge further including a first end wall disposed between said back wall and said first side wall, and a second end wall disposed between said front wall and said second side wall; said first end wall forming an angle with said first side wall and with said back wall; said second end wall forming an angle with said second side wall and with said front wall; one of said first and second end walls including outwardly projecting tongue means, and the other of said first and second end walls including groove means; said tongue means and groove means adapted to mate with a groove means and tongue means, respectively, of another said filter cartridge.

24. An adsorbent filter cartridge as claimed in claim 23, wherein said front and first side walls are formed on a first, plastic, injection molded wall unit, and said back and second side walls are formed on a second, plastic, injection molded wall unit which is identical to, and secured to, said first wall unit.

25. An adsorbent filter cartridge as claimed in claim 24, wherein said first and second wall units are fastened to each other such that they form a space therebetween with which said holes communicate, and such that they form an opening in said filter cartridge which communicates with said space such that said space may be filled with said filter material through said opening after said wall units have been fastened together, and wherein said filter cartridge further includes a lid, said lid extending across said opening to close said opening after said space is filled with said filter material.

26. A filter cartridge as claimed in claim 23, wherein each of said first and second end walls includes both tongue means and groove means.

27. A filter cartridge for filtering chemical gases from a fluid, comprising:
first and second identical, plastic, injection molded wall units secured together, said first and second wall units each including at least one side wall having holes therethrough to allow the fluid to pass through said filter cartridge;
a filter material, said first and second wall units being fastened to each other such that they form a space therebetween with which said holes communicate, and such that they form an opening in said filter cartridge which communicates with said space such that said space may be filled with said filter material through said opening after said wall units have been fastened together; and
a lid extending across said opening to close said opening after said space is filled with said filter material;
said first wall unit including a front wall and a first end wall disposed between, and at an angle with, said front wall and said side wall of said fist wall unit; said second wall unit including a back wall and a second end wall disposed between, and at an angle with, said back wall and said side wall of said second wall unit; one of said fist and second end walls including outwardly projecting tongue means, and the other of said first and second end walls including groove means; said tongue means and groove means adapted to mate with a groove means and tongue means, respectively, of another said filter cartridge.

28. A filter cartridge as claimed in claim 27, wherein said first wall unit includes a front wall having holes therethrough and a first side wall having holes therethrough, and said second wall unit includes a back wall having holes therethrough and a second side wall having holes therethrough, said filter material being enclosed within said walls such that the fluid may flow into said space through said holes in said front and first side walls, contact said filter material such that chemical gases and odors carried by the fluid are filtered out of the fluid by said filter material, and flow out of said space through said holes in said back and second side walls.

29. A filter cartridge as claimed in claim 27, wherein said filter cartridge is an adsorptive filter cartridge, and said filter material is made of a material which is highly adsorptive of chemical gases and odors.

30. A filter cartridge as claimed in claim 27, wherein each of said first and second end walls includes both tongue means and groove means.

* * * * *